April 1, 1969   HIDEO INUZUKA ET AL   3,436,182
PROCESS FOR PREPARING SYNTHETIC DIAMOND BY USING DIRECT
ELECTRIC CURRENT FOR HEATING
Filed May 3, 1968

INVENTORS
Hideo Inuzuka
Musuo Wakatsuki
BY
George Omyoshi
Attorney

United States Patent Office 3,436,182
Patented Apr. 1, 1969

3,436,182
PROCESS FOR PREPARING SYNTHETIC DIAMOND BY USING DIRECT ELECTRIC CURRENT FOR HEATING
Hideo Inuzuka, 1082 Kugahara-cho, Ohta-ku, Tokyo, Japan, and Masao Wakatsuki, 1296 Tokaichiba-cho, Kohoku-ku, Yokohama-shi, Japan
Continuation-in-part of application Ser. No. 446,644, Apr. 8, 1965. This application May 3, 1968, Ser. No. 726,383
Claims priority, application Japan, Apr. 11, 1964, 39/20,321, 39/20,322
Int. Cl. C01b 31/06
U.S. Cl. 23—209.1      2 Claims

ABSTRACT OF THE DISCLOSURE

In the synthesis of diamond by using combined raw materials of a carbonaceous substance and a catalyst metal at high pressure and temperature, passing a D.C. electric current through the raw materials to heat them, an improved process characterized by dividing the above mentioned process of a diamond synthesis into two steps; first, passing the D.C. current through the raw materials in one direction during one period of time; and second, passing the D.C. current through them in the reverse direction during the succeeding period of time.

CROSS-REFERENCES TO RELATED APPLICATION

This is a continuation-in-part of application Ser. No. 446,644, filed Apr. 8, 1965, now abandoned.

BACKGROUND OF THE INVENTION

This invention relates to a method for preparing synthetic diamond, and particularly to an improved process for preparing synthetic diamond using direct electric current to maintain the raw materials at the required temperature for synthesis of diamond.

It has been well known in the art that, to obtain synthetic diamond, a carbonaceous substance and a metallic catalyst are used as the raw materials, and they are put together into a reaction chamber which is installed in a high pressure-high temperature apparatus as shown, for instance, in U.S. Patent 2,941,241. The reaction temperature and pressure are in the range of from about 1000 to 2000° C. and in the range of from 50,000 to 100,000 kg./cm.$^2$ respectively, and the reaction time is generally from about 1 to 5 minutes. The heating of the raw materials is effected by applying an A.C. electric current through the raw materials in the reaction chamber having a capacity of about one cubic centimeter. The electrical resistance of the raw materials in the reaction chamber is of the order of about 0.01 ohm, and some 500 to 1000 amperes are necessary a the heating electric current.

In the prior art mentioned above, the diamond formation takes place only near an area of contact between the raw carbon and the catalyst, a large amount of raw carbon tends to remain unreacted in the reaction chamber after the synthesis, lowering the efficiency of diamond synthesis. Furthermore, according to the above method, it is difficult to form crystals of large size and of good quality.

In an attempt to improve upon this prior art method, a method has been proposed wherein a D.C. electric current is used in lieu of the A.C. current for the heating, and the heating current is applied directly to a mass comprising a mixture of raw carbon and a catalyst. It has been found that, by such arrangement, the region of diamond crystal formation within the reaction chamber becomes enlarged and some of the crystals formed are large and of good appearance. When compared with irregular crystals bearing a feather like or fish-bone like pattern, which are liable to be formed in case of heating by an A.C. current, heating by a D.C. current causes regular and large-sized diamonds to be formed which bear crystal faces giving an octahedron, or an octahedron and cube, form viz. (111) faces, or (111) and (100) faces. These effects are particularly prominent near the positive end of the current path through the raw materials.

The reason for the occurrence of these effects is not yet clear. However, as the catalyst is thought to be in the liquid phase at the high temperature and high pressure required for diamond synthesis, it is conjectured that some sort of electrophoresis occurs in the synthetic reaction so that conditions favoring crystal formation such as a suitable concentration gradient, are produced by the segregation resulting from the electrophoretic action. Under these conditions the region in which diamond formation occurs is concentrated at one terminal of the current pass, and the amount of diamond formed is increased and crystals of good quality and large size may be formed. It is still not clear, however, whether D.C. electric field has any direct effect or not on the formation of the crystal nucleus.

However, in the above mentioned electrophoretic method by the D.C. current, the conversion efficiency of raw carbon to diamond is very different at the positive and negative side terminals. At the positive terminal the raw carbon is transformed into diamond with an extremely high efficiency, while the conversion efficiency at the negative terminal is low, with the result that the overall conversion efficiency of carbon to diamond still remains to be improved.

BRIEF SUMMARY OF THE INVENTION

According to the present invention there is provided an improved method of preparing synthetic diamond wherein the raw materials including a raw carbonaceous substance and a catalyst are heated in the reaction chamber installed in a high pressure-high temperature apparatus to a temperature of from 1,000 to 2,000° C. by passing a D.C. electric current through said raw materials while subjected to a pressure of from 50,000 to 100,000 kg./cm.$^2$.

The method of the present invention is characterized by that D.C. current is passed through said raw materials in one direction during one period of time, and in the reverse direction during the succeeding period of time.

Preferably the pressure applied to the raw materials during the passage of D.C. current in the reverse direction is raised by about 5,000 kg./cm.$^2$ above its value during the passage of current in the first direction.

DETAILED DESCRIPTION

Figures 1, 2, 3, 4:
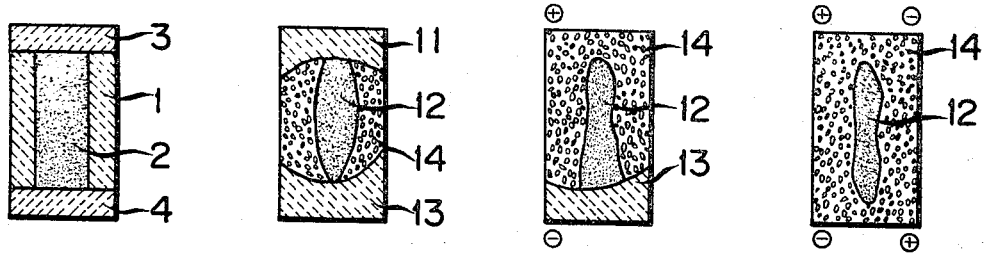
FIG. 1 shows generally a schematic representation illustrating an arrangement of a raw carbonaceous substance and a catalyst to be kept in the reaction chamber installed in a high pressure-high temperature apparatus.
FIG. 2 shows a schematic representation illustrating the final state derived from FIG. 1 after the synthesis using A.C. heating electric current.
FIG. 3 shows a representation similar to FIG. 2 after the synthesis using D.C. heating current.
FIG. 4 shows a representation similar to FIG. 2 after the synthesis using the polarity inversion heating method of the present invention.

The method of synthesizing diamond according to this invention will now be described with reference to the embodiments shown in the accompanying drawing. In FIG. 1 a catalyst body 2 which may consist of a catalyst material or of a mixture of carbon and catalyst material is contained in a cylindrical vessel 1 having lids or covers 3 and 4, which are all made of graphite. The vessel 1 and the lids 3 and 4 serve not only as a casing for the catalyst body, but slso as a raw carbonaceous material for diamond synthesis. When this vessel containing raw materials is kept in a reaction chamber of high pressure-high temperature apparatus, which is, for instance, shown in U.S. Patent 2,941,241, and is heated by the passage of A.C. current through the raw materials according to the usual method, the result will be as shown in FIG. 2. There will be seen large masses 11 and 13 of unreacted graphite remaining in the upper and the lower portions of the columnar body, of which the central portion comprises a mass 12 of impurities arising mainly from the catalyst, while a collective mass 14 of diamond crystals is present around the central mass 12. In this case, the diamond particles forming the collective mass 14 are very small, and many of them are of irregular configuration having feather or fish-bone like patterns, although some crystals exhibit appropriate crystal faces.

When the raw materials disposed as shown in FIG. 1 are heated by the application of D.C. current instead of A.C. current, the result will be as shown in FIG. 3. In this case, the mass 12 of impurities forming the central portion is smaller than that in FIG. 2, and no mass of unreacted graphite is present at the positive terminal, so that the mass 14 of diamond particles is enlarged to extend from the outer periphery of the mass 12 and to the positive end of the columnar body. The mass 14 of diamond particles includes relatively large and uniform crystals and the space around the particles is filled with the catalyst metal. At the negative end, however, there remains a mass 13 of unreacted graphite.

Should the unreacted graphite mass 13 in FIG. 3 be effectively utilized, the conversion efficiency of the raw carbon to diamond would naturally be improved. In accordance with the present invention, it is proposed to switch off the D.C. current when the state shown in FIG. 3 is reached and reverse the polarity of the electrodes, and then to perform secondary heating by a reverse D.C. current. By so doing, the raw carbon at the initially negative end which has not been transformed to diamond in the first heating step may be transformed to diamond in the second heating step, so that almost all of the raw carbon can be effectively utilized as shown in FIG. 4.

Figures 5, 6, 7, 8:
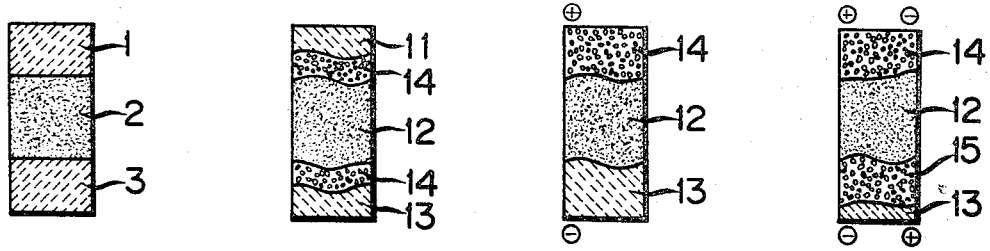
FIG. 5 shows generally a schematic representation illustrating another arrangement of a row carbonaceous substance and a catalyst similar to FIG. 1.
FIG. 6 shows a schematic representation illustrating the final state derived from FIG. 5 after the synthesis using A.C. heating electric current.
FIG. 7 shows a representation similar to FIG. 6 after the synthesis using D.C. heating current.
FIG. 8 shows a representation similar to FIG. 6 after the synthesis using the polarity inversion heating method of the present invention.

FIGS. 5 to 8 generally show modifications of FIGS. 1 to 4, wherein FIG. 5 illustrates a disposition of raw materials in which a layer 2 of a catalyst is sandwiched between two orbicular solid graphite disks 1 and 3 positioned in the upper and the lower portions of the assembly in a symmetrical relationship with each other. By heat treatment using A.C. electric current, the state of mass will become as shown in FIG. 6. On the other hand, when a D.C. current of constant polarity is used, the state of mass will become as shown in FIG. 7, and when the polarity of the direct current is reversed during the process, it will become as shown in FIG. 8. The reference numerals employed in all figures are intended to have the same significance. The reference numeral 15 in FIG. 8 represents the additional mass of diamond particles by using the reversed D.C. current.

Care must be taken in carrying out this invented method, since whole or a part of the diamond particles formed in the first synthesizing stage may sometimes be transformed back to black graphite during the second synthesizing stage after the reversal of polarity. It is thought that this is due to the fact that the electrical resistance of the mass zone of diamond particles synthesized in the first stage is large, so that the temperature of this portion of the reaction mass becomes higher than that of other parts of the mass during electrical heating in the second synthesizing stage, with the result that the thermodynamic stability of the diamond may be upset and the already synthesized diamond may be transformed back to graphite. In order to remove this disadvantage, it is preferable for the pressure in the reaction chamber to be increased by about 5000 kg./cm.$^2$ after the first synthesizing stage and prior to the second synthesizing stage. For example, when the first stage of diamond synthesis by using a D.C. current is performed at a pressure of 65,000 kg./cm.$^2$ and a temperature of 1500° C., and the second synthesis is performed at the same pressure and temperature as above by using a reverse D.C. current, a transformation of diamond granules back to graphite sometimes occurs in part. But the second synthesis carried out at a pressure of 70,000 kg./cm.$^2$ at a temperature of 1500° C. causes no such back transformation. This is because that the thermodynamic stability of diamond can be maintained at somewhat higher temperature owing to the increased pressure during the second synthesis. Theoretically stated, a pressure increase of about 5000 kg./cm.$^2$ causes a rise in allowed temperature of about 200° C.

Thus, according to the improved method of the present invention, it is possible to synthesize diamond with a higher conversion efficiency than that in the usual method using D.C. electric current for heating. It is to be understood that the method according to this invention may be practised in various modified forms as to particular arrangements without departing from the scope and spirit of the invention.

EXAMPLES

The process and advantages of the present invention will be more fully understood with reference to the following specific examples. All parts are by weight.

Example 1

Raw materials comprising cylindrical graphite 1 of 4 mm. in outer diameter, 1 mm. thick and 5 mm. high, lids 3 and 4 of 4 mm. in diameter and 1 mm. in thickness, and a mass 2 of catalyst consisting of 2 parts of nickel powder and 1 part of chromium carbide powder were disposed as shown in FIG. 1. Said raw materials were inserted in a reaction vessel of high pressure-high temperature apparatus as shown in U.S. Patent 2,941,241 to be heated by using a D.C. current of maximum 276 amperes at a temperature of 1,400° C. for 3 minutes under a pressure of 65,000 kg./cm.$^2$, voltage-drop through the raw materials being 1.1 volts. Then the direction of the electric current was reversed with the pressure maintained to keep 65,000 kg./cm.$^2$, and the current of 212 amperes was passed through said raw materials for 3 minutes, the voltage-drop through the second heating step being 1.45 volts. During the second heating stage the average temperature of the materials was kept in 1,400° C. After the whole synthetic reaction was finished, 67 mg. of diamond crystals were obtained.

Comparatively, in accordance with the usual no reversing method, raw materials similar to the above were heated by using a D.C. current to get a synthetic temperature of 1,400° C. for 6 minutes under a pressure of 65,000 kg./cm.$^2$. In this case, the yield of diamond crystals was only 58 mg.

Example 2

Raw materials comprising a mass 2 of catalyst consisting of 3 parts of iron powder and 1 part of tungsten carbide powder, the dimensions thereof being 3 mm. in thickness and 3 mm. in diameter, and two solid graphite disks 1 and 3 of 3 mm. in diameter and 2 mm. thickness as shown in FIG. 5, was subjected to the synthetic reaction at a temperature of 1,500° C. using a heating D.C. current of 225 amperes for 1 minute under a pressure of 65,000 kg./cm.$^2$ in the reaction chamber same as in Example 1, the voltage-drop through the raw materials being 1.0 volt. Then, the pressure on the system was raised up to 70,000 kg./cm.$^2$ and the direction of the electric current was reversed, and then 183 amperes of the D.C. current was passed through the raw materials for 1 minute. The voltage-drop through the second heating step was 1.25 volts. After both reaction stages, most of the raw carbon was transformed into diamond crystals and 34 mg. of diamond crystals were obtained.

On the other hand, another experiment was repeated under the same conditions except that it was carried out without raising the pressure in the second heating stage. In this case, only 24 mg. of diamond crystals were obtained.

Comparatively, in accordance with the usual no reversing method, raw materials similar to the above were heated using a D.C. current to get a synthetic temperature of 1,500° C. for 2 minutes under a pressure of 70,000 kg./cm.$^2$. In this case, the yield of diamond crystals was only 19 mg.

What is claimed is:
1. In the synthesis of diamond in a reaction chamber installed in a high pressure-high temperature apparatus which includes subjecting combined raw materials of a non-diamond form of carbon and a catalytic substance to sufficiently high temperature and pressure to obtain a transition from the non-diamond form of carbon to diamond, passing a D.C. electric current through the raw materials to heat them, an improved process characterized by dividing the above mentioned process of diamond synthesis into two steps; first, passing the D.C. current through said raw materials in one direction during one period of time; and second, passing the D.C. current through them in the reverse direction during the succeeding period of time.
2. An improved process according to claim 1 wherein the pressure of the second step is raised by about 5,000 kg./cm.$^2$ more than that of the first step.

References Cited

UNITED STATES PATENTS

| | | | |
|---|---|---|---|
| 2,941,241 | 6/1960 | Strong | 23—209.1 X |
| 2,947,609 | 8/1960 | Strong | 23—209.1 |
| 2,992,900 | 7/1961 | Bouenkerk | 23—209.1 |

EDWARD J. MEROS, *Primary Examiner.*

U.S. Cl. X.R.

23—209.3